United States Patent [19]

Griffin

[11] Patent Number: 4,487,448
[45] Date of Patent: Dec. 11, 1984

[54] UNITIZED WINDOW ASSEMBLY

[75] Inventor: Henry W. Griffin, Birmingham, Mich.

[73] Assignee: General Motors Corporation, Detroit, Mich.

[21] Appl. No.: 526,669

[22] Filed: Aug. 26, 1983

[51] Int. Cl.³ .............................................. B60J 1/02
[52] U.S. Cl. ................................. 296/146; 296/84 R; 52/208; 52/400
[58] Field of Search ................... 296/146, 84 R, 84 D; 52/208, 474, 400, 397; 411/82, 81, 171, 166

[56] References Cited

U.S. PATENT DOCUMENTS

| | | | |
|---|---|---|---|
| 3,802,143 | 4/1974 | Adler et al. | 52/400 |
| 4,072,340 | 2/1978 | Morgan | 296/84 R |
| 4,139,234 | 2/1979 | Morgan | 296/84 R |
| 4,364,595 | 12/1982 | Morgan et al. | 296/84 R |

FOREIGN PATENT DOCUMENTS 678891  9/1962  United Kingdom .

Primary Examiner—Robert R. Song
Attorney, Agent, or Firm—Patrick M. Griffin

[57] ABSTRACT

An improved modular window assembly includes a window glass and peripheral frame having a plurality of threaded attached studs spaced therealong extending through matching grommet lined holes spaced inwardly from the peripheral edge of the glass. The frictional engagement of the threaded studs with the grommets serves to retain the glass and frame together as a separately handled unit with no necessity of an injection molded gasket. The window unit may be attached to the pinchweld of a vehicle window opening by dropping the studs through matching holes and threading fasteners to the studs to draw down the window frame. This serves to compress the grommets further to seal the holes through the window glass. A bead of sealant or adhesive may be used in conjunction with the window assembly if desired, and the inwardly spacing of the studs creates an unobstructed space therefor.

2 Claims, 3 Drawing Figures

UNITIZED WINDOW ASSEMBLY

BACKGROUND OF THE INVENTION

The modern trend in the installation of fixed vehicle windows is away from the old method of a separate frame built up piecemeal after the glass panel was lain in place in the window opening with a bead of sealant, and toward simpler methods and structures, such as the retention of a glass panel with adhesives in various flush glass or near flush glass configurations, or the recent use of unitized or modular windows in which glass, gasket and frame are molded or otherwise held together as a separate unit and dropped into place as a unit.

Flush glass styles of windows are preferred when a bright exterior molding is not desired. Two general styles of modular windows incorporating a bright molding are illustrated by the U.S. Pat. Nos. to Morgan, 4,139,234, and to Morgan et al, 4,364,595. The basic structure disclosed in the patent to Morgan, U.S. Pat. No. 4,139,234, is a modular window including a glass panel and a peripheral bright molding or bezel with a polyvinylchloride gasket molded integrally around the peripheral edge of the panel and apertured attachment members on the inside of the bezel to maintain the glass panel and bezel as a modular or unitized assembly. Attachment bolts are also joined to the inside of the bezel and pass through apertures in the window opening pinchweld as the unit is assembled in place. Fastening nuts maintain the window unit in place and act to compress a bead of sealant between the inside of the bezel and the outside surface of the vehicle body adjacent the window opening. The main problem with such a structure and its variations is that it is difficult and expensive to maintain all elements in the proper position within the mold and to quality control the glass so that the mold glass contact edge does not allow the escape of any polyvinylchloride during the injection molding step. In addition, the area between the peripheral edge of the glass window panel and the window opening pinchweld is obstructed by the attachment bolts passing therethrough, which makes sealing more difficult, as may be seen in FIG. 5 of the patent.

The patent to Morgan et al, U.S. Pat. No. 4,364,595, shows a different approach to modular assembly. In the embodiments there disclosed, a series of separate clip and stud assemblies are adhesively attached to the back of a window panel very near the peripheral edge thereof, creating a relatively simple modular unit, these studs passing again through holes in the body pinchweld defining the window opening. However, the addition of a separate decorative trim member is necessary to mask the clips, which would otherwise be visible from the outside of the vehicle, and the sealant area between the window opening pinchweld and peripheral edges of the glass is again obstructed by the attachment bolts.

SUMMARY OF THE INVENTION

The subject invention discloses an improved modular or unitized window assembly which allows for either mechanical or adhesive retention of a window assembly where a bright exterior molding is desired. The exterior molding, attachment members and glass panel are all retained together as a separate unit, which may be dropped in place in the window opening, without the use of any injection molding. In addition, the area between the body pinchweld defining the window opening and peripheral edges of the glass is unobstructed and may be easily filled or sealed.

In the preferred embodiment, a vehicle body having an outer panel includes a window opening defined therein by a peripheral flange having a first wall which extends generally inwardly of the outer panel of the vehicle body and a second wall extending from the first in a plane generally parallel to and offset from the outer panel. This window opening is closed by the window assembly of the invention, which includes a glass panel sized somewhat smaller than the opening and having a peripheral edge and generally planar front and back surfaces adjacent the peripheral edge. A plurality of holes are cut through the window panel spaced inwardly from the peripheral edge. A mounting frame shaped and sized to border the peripheral edge of the window panel has in the embodiment disclosed, a bright metal stamping with parallel side edges with underturned flanges which abut the top surface of the window panel. The top surface thereof is decorative and visible from the outside of the vehicle while the undersurface faces toward the inside of the vehicle.

A series of attachment members comprising clips are slidably captured beneath the frame within the underturned flanges, and each has a threaded stud extending therefrom toward the inside of the vehicle. Elastomer grommets are press fitted through the holes in the window panel and the mounting frame is attached to the window panel by force fitting the threaded studs through the grommets. In addition, a peripheral sealing member has a first lip captured between the top surface of the window panel and one edge of the mounting frame and a second lip which overhangs the surface of the outer panel adjacent to the window opening. The forced frictional fit of the studs through the grommets thus maintains the molding, glass, attachment members and sealing member together as a modular unit, without the necessity of any adhesives or injection molding steps.

To mount the window assembly, the attachment studs are passed through matching holes in the second wall of the peripheral flange of the window opening after a bead of sealant or adhesive is placed along the peripheral edge of the glass panel. Because of the location of the studs and holes through the window glass, the space for this sealing bead is unobstructed. The attachment of nuts to the studs serves to draw the mounting frame down, compressing the sealing or adhesive bead, and compressing the lips of the sealing member between the mounting frame and the glass and over the outer panel to further seal and mask the gap between the window panel peripheral edge and first wall of the window opening peripheral flange.

It is, therefore, a general object of the invention to provide an improved modular or unitized window assembly for mechanical or adhesive attachment of a fixed window panel within a window opening in a vehicle body.

It is a more specific object of the invention to provide such a window panel in which the components of the assembly are maintained together without injection molding or adhesives.

It is a still more specific object of the invention to provide such a window assembly in which a mounting frame engageable with the periphery of the top surface of the window panel includes attachment studs friction fitted through grommet lined holes through the window panels spaced inwardly from the peripheral edge of the window panel to maintain the components of the assembly together, and to allow the window assembly to be attached to the peripheral flange of the window opening with an unobstructed sealant spaced between the peripheral edge of the window panel and the peripheral flange of the window opening.

DESCRIPTION OF THE PREFERRED EMBODIMENT

Figure 1:
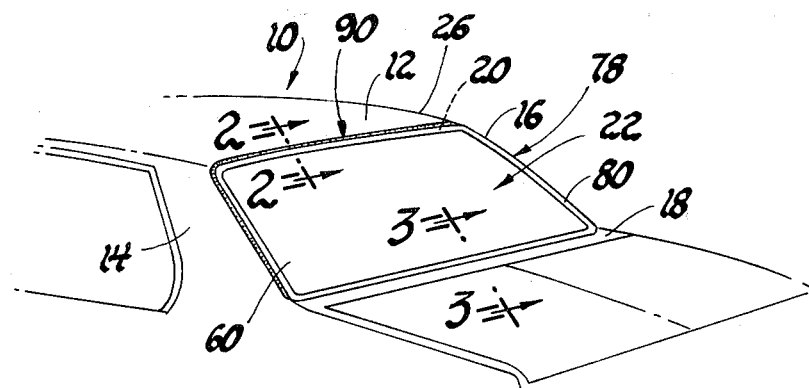
Figure 1:
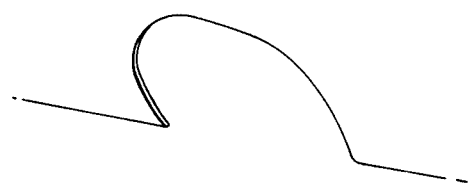
Figure 2:
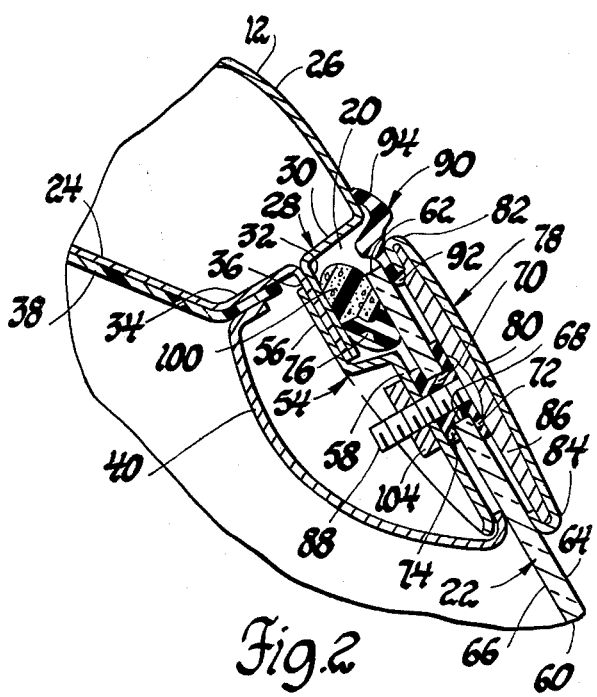
Figure 3:
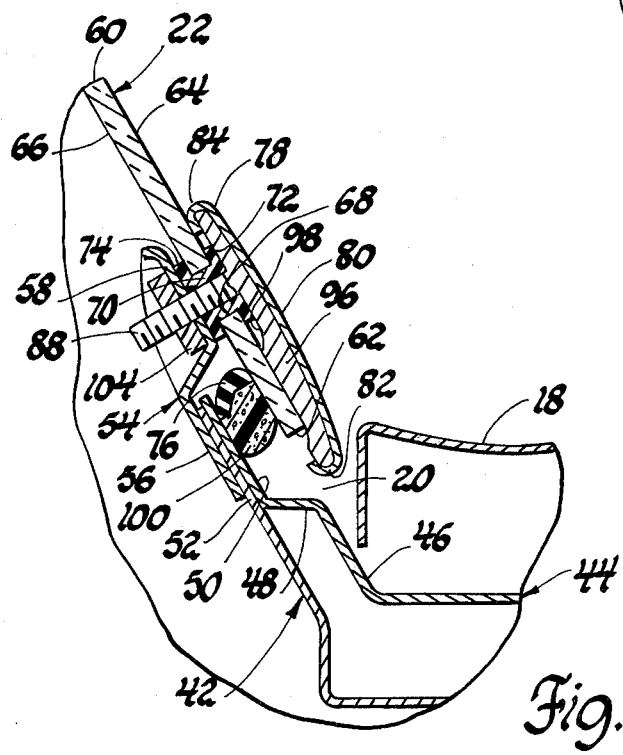

These and other objects of the invention will appear from the following written description and drawings in which:

FIG. 1 is a fragmentary view of the rear of a vehicle showing the window assembly of the invention, FIG. 2 is a sectional view along line 2—2 of FIG. 1, and FIG. 3 is a sectional view along the line 3—3 of FIG. 1.

Referring first to FIG. 1, the vehicle body designated generally at 10 includes a conventional roof structure 12, quarter panels 14 and 16 of which are visible, and a lower tulip panel 18 which cooperated to define a conventional rear window opening 20 closed by the window assembly of the invention, designated generally at 22.

Referring to FIG. 2, it will be seen that the roof structure 12 includes an inner panel 24 and an outer panel 26. Outer panel 26 includes a flange peripheral to window opening 20 and designated generally at 28 which has a first wall 30 extending generally inwardly of outer panel 26 and a second wall 32 extending generally perpendicular thereto in a plane parallel to and offset from the plane of outer panel 26. Inner panel 24 has similar first and second walls 34 and 36 and the two second walls 36 and 32 are abutted and pinchwelded together. A fabric headlining 38 is attached to the inside of panel 24 and has its inner edge concealed by a garnish molding 40 which is in turn attached in a manner to be described below. The quarter panels 14 and 16 have flanges peripheral to the window opening 20 similar to those of roof structure 12, and are not illustrated. Finally, the bottom of window opening 20 includes a similar flange designated generally at 42 formed from that part of the trunk structure 44 concealed beneath tulip panel 18 and having an outer panel 46 with a first wall 48 and a second wall 50 which is abutted with and pinchwelded to an inner panel 52. Thus, window opening 20 has what is effectively a continuous flange structure along its entire perimeter made up of all the pinchwelds as described.

In addition, an auxiliary frame 54 extends generally inwardly from all of the pinchwelds, and as seen in FIG. 2, has an attachment flange 56 spot welded thereto and a series of local offsets 58 stamped therein. This is because the flange 28 is designed for the adhesive attachment of a window panel. The auxiliary frame 54 allows adaption for mechanical attachment of a window panel with a visible bright molding, as will be described below. This is an extra feature of the invention, and it will be understood that auxiliary frame 54 could be stamped as an integral part of the flange peripheral to window opening 20, if desired, and is, in practical effect, part of the second wall 32 of flange 28.

Still referring to FIG. 2, window assembly 22 includes a window panel 60 which has a peripheral edge 62 and generally planar front and back surfaces 64 and 66 respectively adjacent thereto. A series of attachment holes 68 are drilled through window panel 60 spaced inwardly from peripheral edge 62 at selected locations. The number of holes 68 would be those necessary to provide secure retention of the particular size window panel 60. Each hole 68 is lined with a resilient elastomer grommet 70 which is of a size to press fit tightly through holes 68, engaging the edges thereof, and covering both the top and bottom with integral rings 72 and 74 respectively. Finally, a flexible rubber dam 76 is bonded to back surface 66 between peripheral edge 62 and attachment holes 68.

A mounting frame designated generally at 78 comprises an elongated sheet metal member having a visible top surface 80 and parallel first and second inwardly turned edges 82 and 84. The width of mounting frame 78 is substantially equal to the width of auxiliary frame 54. A series of clips 86 of a generally rectangular shape are slidably captured within inwardly turned edges 82 and 84, one clip for each attachment hole 68. Clips 86 are slidable but not loosely held. An attachment member, in this case a threaded stud 88, extends from the undersurface of clip 86, and may be integral therewith or welded thereto. The final component of the assembly is a peripheral sealing strip 90 which has a first lip 92 engageable beneath edge 82 and against front surface 64 near peripheral edge 62 and a second lip 94 of a length sufficient to extend over outer panel 26. Sealing strip 90 does not contribute to the invention in its broadest sense, but is practically necessary in a window application. While mounting frame 78 has been described with respect to FIG. 2 and its cross section through roof structure 12, it will be understood that it borders the entire periphery of window panel 60. Along the bottom of window panel 60, adjacent to tulip panel 18, a slightly different clip designated at 96 is used, the lower surface of which has a recess at 98. Attachment holes 68, threaded studs 88 and grommet 70 are the same. Sealing strip 90 does not extend along the bottom, where it is unnecessary.

The components of window assembly 22 described above are assembled as follows, as seen in FIG. 2. Threaded studs 88 are inserted partway through grommets 70 until inwardly turned edges 82 and 84 of mounting frame 78 are near front surface 64. Then, the first lip 92 of sealing strip 90 is inserted into place between edge 82 and front surface 64, and mounting frame 78 is pushed down firmly until edge 84 engages front surface 64. Top ring 72 of grommet 70 will be slightly compressed along with first lip 92. The same occurs along the sides of window panel 60, where a cross-sectional view would be nearly identical to FIG. 2. Along the bottom of window panel 60, as seen in FIG. 3, edge 84 overlies front surface 64, but edge 82 does not, and there is no sealing strip 90. Top ring 72 is compressed slightly within recess 98 of clip 96. The frictional capturing of studs 88 within grommets 70 maintains this slight compression and retains all components together with no adhesives or injection molding. It will be understood that the slidable capturing of clips 86 and 96 within mounting frame 78 allows for some adjustment during this assembly step, but a solid frame 78 integrating clips 86 and visible top surface 80 would work in the same fashion.

Window assembly 22 is then assembled to vehicle body 10 as follows. A bead of adhesive or sealant 100 is applied to the back surface 66 all along dam 76. Assembly 22 is then loaded within window opening 20 by passing studs 88 through matching attachment holes 102 through local offsets 58 until bottom ring 74 is engaged.

This serves to locate window panels 60 in a plane substantially the same as the plane of the outer panel 26 as is best visible in FIG. 2, and also inwardly spaced peripheral edge 62 from first wall 30. The addition of fastener nuts 104 to studs 88 serves to draw mounting frame 78 down, compressing bottom rings 74 against stamped offsets 58, compressing bead 100, as well as further compressing lip 92 and top rings 72. Further, second lip 94 is maintained in firm engagement over outer panel 26. Along the top of window 60, edges 82 and 84 will lightly engage front surface 64. Along the bottom of window panel 60, edge 84 and the lower surface of clips 96 engage front surface 64. The top and bottom rings 72 and 74 of grommets 70 assure that window assembly 22 is adequately sealed from the ambient, so that grommets 70 serve both a retention and sealing function. Bottom rings 74 also serve to insulate back surface 66 from auxiliary frame 54. The space where sealant bead 100 lies is completely unobstructed, and frame 78 is wide enough to mask auxiliary frame 54 from view from outside the vehicle. Finally, garnish molding 40 may be snapped in place over the inner edge of auxiliary frame 54 and against the edge of head-lining fabric 38 all along the interior of the vehicle. This may be easily snapped off again to give access to fastening nut 104.

Several variations in the construction of window assembly 10 may be made. As already mentioned, mounting frame 78 could be a continuous casting, in effect integrating the under surface of clips 86 and frame 78, although this would be a heavier assembly and the movability of the clips 86 and 96 would be sacrificed. In addition, if bead 100 is an adhesive material, rather than a mere sealant, fewer studs 88 may be used as the actual attachment of window panel 60 will be not entirely mechanical. In all embodiments, the frictional capturing of the studs through the grommet lined attachment holes in the glass provides the simple retention of the components as a unitized assembly, as well as providing the means for attachment of the window assembly to a vehicle, again without any injection molding steps or adhesives.

The embodiments of the invention in which an exclusive property or privilege is claimed are defined as follows:

1. In a vehicle body or the like having an outer panel with a window opening therein including a peripheral flange having a first wall extending generally inwardly of the outer surface and a second wall extending generally in a parallel plane offset from the plane of the outer panel, a unitized window assembly for closing the window opening, comprising, a window panel receivable in the opening and having a peripheral edge and generally planar front and back surfaces adjacent thereto, the window panel having a plurality of holes passing through the front and back surfaces and spaced inwardly from the peripheral edge, a mounting frame generally bordering the peripheral edge of the window panel, and including an upper surface visible from outside the vehicle and an under surface engageable with the front surface of the window panel, attachment members connected to and extending from the under surface of the frame through the holes in the window panel, and resilient retention and sealing members frictionally engageable between the attachment members and the edges of the window panel holes to retain the window panel and mounting frame together as a unitized assembly, the unitized window assembly being locatable within the window opening with the window panel peripheral edge spaced from the first wall of the window opening flange by passing the attachment members through aligned locating holes in the second wall of the window opening flange until the back surface of the window panel is juxtaposed the second wall of the window opening flange, the addition of fastening members to the attachment members maintaining the assembly in place by drawing the mounting frame under surface toward the window panel front surface while compressing the sealing and retention members to seal the window panel holes.

2. In a vehicle body or the like having an outer surface with a window opening therein including a peripheral flange having a first wall extending generally inwardly of the outer surface and a second wall extending generally in a parallel plane offset from the plane of the outer panel, a unitized window assembly for closing the window opening, comprising, a window panel receivable in the opening and having a peripheral edge and generally planar front and back surfaces adjacent thereto, the window panel having a plurality of holes passing through the front and back surfaces and spaced inwardly from the peripheral edge, a mounting frame generally bordering the peripheral edge of the window panel, and including an upper surface visible from outside the vehicle and an under surface engageable with the front surface of the window panel, attachment members connected to and extending from the under surface of the frame through the holes in the window panel, and resilient grommets lining the window panel holes including upper and lower rings engaged with the front and back surface of the window panel respectively, the frictional engagement between the attachment members and the grommets retaining the window panel and mounting frame together as a unitized assembly, the unitized window assembly being locatable within the window opening with the window panel peripheral edge spaced from the first wall of the window opening flange by passing the attachment members through aligned locating holes in the second wall of the window opening flange until the bottom grommet ring engages the second wall of the window opening flange, the addition of fastening members to the attachment members retaining and sealing the assembly by drawing the mounting frame down to compress the top grommet ring between the mounting frame under surface and the front surface of the window panel and the bottom grommet ring between the window panel back surface and the second wall.

* * * * *